United States Patent [19]

Brammer et al.

[11] 4,379,413

[45] Apr. 12, 1983

[54] ANGLE DRIVE UNIT

[75] Inventors: Michael A. Brammer, Columbia City; Donald P. Bowers, Fort Wayne, both of Ind.

[73] Assignee: Dana Corporation, Toledo, Ohio

[21] Appl. No.: 200,182

[22] Filed: Oct. 24, 1980

[51] Int. Cl.³ .............................................. F16H 1/44
[52] U.S. Cl. ...................................... 74/710.5; 74/713
[58] Field of Search ............... 74/417, 713, 416, 710.5

[56] References Cited

U.S. PATENT DOCUMENTS

| | | | |
|---|---|---|---|
| 2,378,589 | 6/1945 | Slack et al. | 115/34 |
| 2,557,937 | 6/1951 | Buckendale | 74/713 |
| 2,558,841 | 7/1951 | Gordon | 74/417 |
| 3,651,713 | 3/1972 | Mueller | 74/713 |
| 4,169,394 | 10/1979 | Estrada | 74/713 |
| 4,269,086 | 5/1981 | Altmann | 74/710.5 |

Primary Examiner—Kenneth Dorner
Assistant Examiner—D. Wright
Attorney, Agent, or Firm—Robert M. Leonardi; Norb A. Heban

[57] ABSTRACT

A drive unit is disclosed having interlocking members for directly connecting angularly disposed drive and driven shafts. The interlocking members comprise conventional pinion mate and side gear blanks supported in a standard differential housing driven by a drive shaft through a ring and pinion gear set. Pinion mate gear blanks are connected by the usual cross shaft to the differential housing. Side gear blanks cooperate with the pinion mate gear blanks and are connected to the driven shaft. Integral locking surfaces provided on the mating gear blanks cooperate to prevent the side gear blanks from rotating relative to the differential housing so that a direct drive power path is established between the drive and driven shafts.

9 Claims, 9 Drawing Figures

ANGLE DRIVE UNIT

BACKGROUND OF THE INVENTION

This invention relates generally to right angle drive units and more particularly to a drive connection for such devices.

Right angle drive units having drive connections directly connecting angularly disposed drive and driven shafts are well known. Drive units of this type are widely used in agricultural, mining, stationary and mobile industrial and railway applications. In such applications, it is common practice to use a conventional differential housing and modify or replace certain standard parts so that they cooperate with the differential housing to establish a direct drive between angularly disposed drive and driven shafts.

One method is to provide a modified cross member having its outer ends fixed to the differential housing and directly key or spline the driven shafts to central openings in the cross member. Another known method consists of using all conventional differential parts, i.e., differential housing, cross shaft and cooperating pinion mate and side gears, and welding the internal parts so that they are prevented from rotating relative to each other.

While the above devices operate satisfactorily, some are structurally complex and costly while others using all standard parts are difficult to disassemble when replacement is necessary.

SUMMARY OF THE INVENTION

The present invention is a drive unit comprising mating input and output members supported in a standard differential housing. Integral locking means constructed on the input and output members engage to lock the members to the differential housing. In a preferred embodiment the input and output members are gear blanks and the locking means are provided on at least one of the members.

DESCRIPTION OF THE PREFERRED EMBODIMENT

Figure 1:
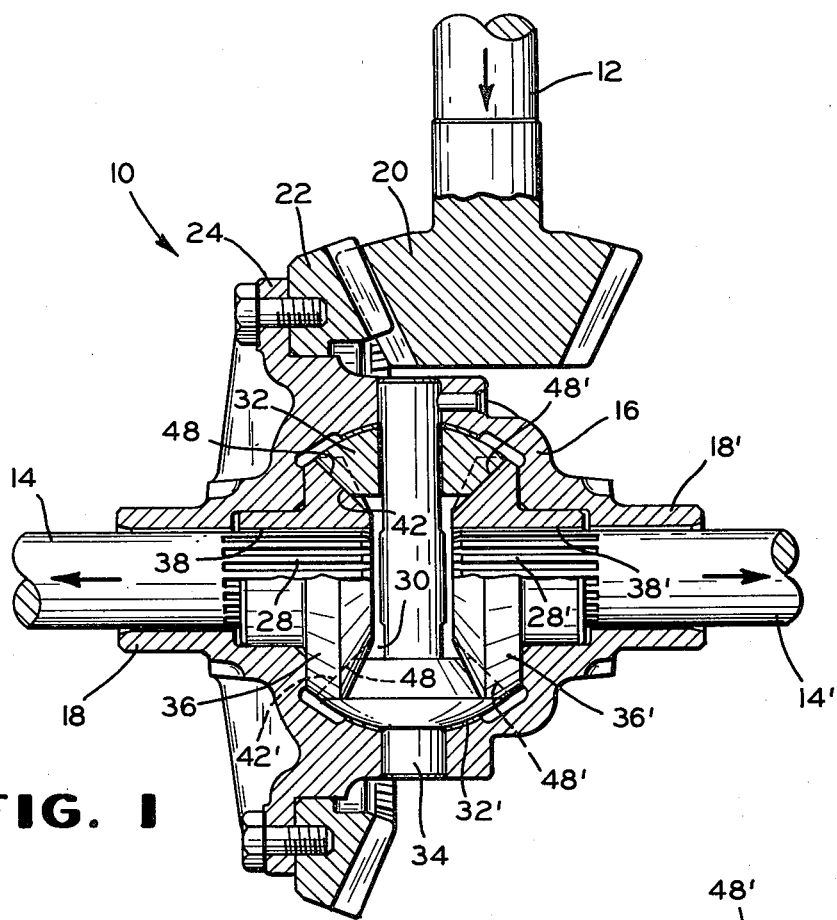
FIG. 1 is a partial horizontal sectional view of a drive unit utilizing a drive means of the present invention.

Referring to FIG. 1 of the drawings, a right angle drive unit is shown generally at 10 for drivingly connecting drive shaft 12 with axially aligned opposed driven shafts 14 and 14'. Drive unit 10 comprises a standard differential housing 16 formed with oppositely extending trunnions 18, 18'. Trunnions 18, 18' are adapted to receive bearings (not shown) for rotatably supporting differential housing 16 in a standard carrier (not shown) or gear case assembly. Differential housing 16 is drivingly connected to drive shaft 12 by a hypoid or bevel pinion gear 20 meshing with a hypoid or bevel ring gear 22. Pinion gear 20 is constructed on the inner end of drive shaft 12 while ring gear 22 is secured to a radially outwardly extending annular flange 24 provided on differential housing 16.

Opposed driven shafts 14, 14' have inner splined ends 28, 28' projecting through trunnions 18, 18' into a central chamber 30 formed in differential housing 16. Chamber 30 is of sufficient size to receive drive means for directly connecting differential housing 16 to driven shafts 14, 14'.

In a preferred embodiment, the drive means include input members drivingly connected to differential housing 16 and driven members drivingly connected to driven shafts 14, 14'. The input and output members are standard unfinished gear blanks such as those normally used in conventional differentials prior to forming the mating gear teeth. The input members comprise a pair of spaced apart pinion mate gear blanks 32, 32' supported on a cross shaft 34. Cross shaft 34 has its ends fixed in differential housing 16 in a conventional manner. The output members comprise a pair of side gear blanks 36, 36' positioned on opposite sides of pinion mate gear blanks 32, 32'. Side gear blanks 36, 36' have central splined openings 38, 38' for receiving splined ends 28, 28' of driven shafts 14, 14' respectively.

Pinion mate gear blanks 32, 32' and side gear blanks 36, 36' are positioned within the differential housing chamber 30 in a conventional manner. The usual thrust washers are located in the differential housing between the outer faces of the pinion mate gear blanks. The thrust washers for pinion mate gear blanks 32, 32' are inset in the differential housing chamber 30 and have a contour conforming to the pinion gear blank outer faces. While not required, thrust washers may also be located between the outer faces of side gear blanks 36, 36' and opposed interior side walls formed in chamber 30. The usual hubs are formed on side gear blanks 36, 36' for reception in cylindrical recesses provided in housing chamber 30.

Figure 2:
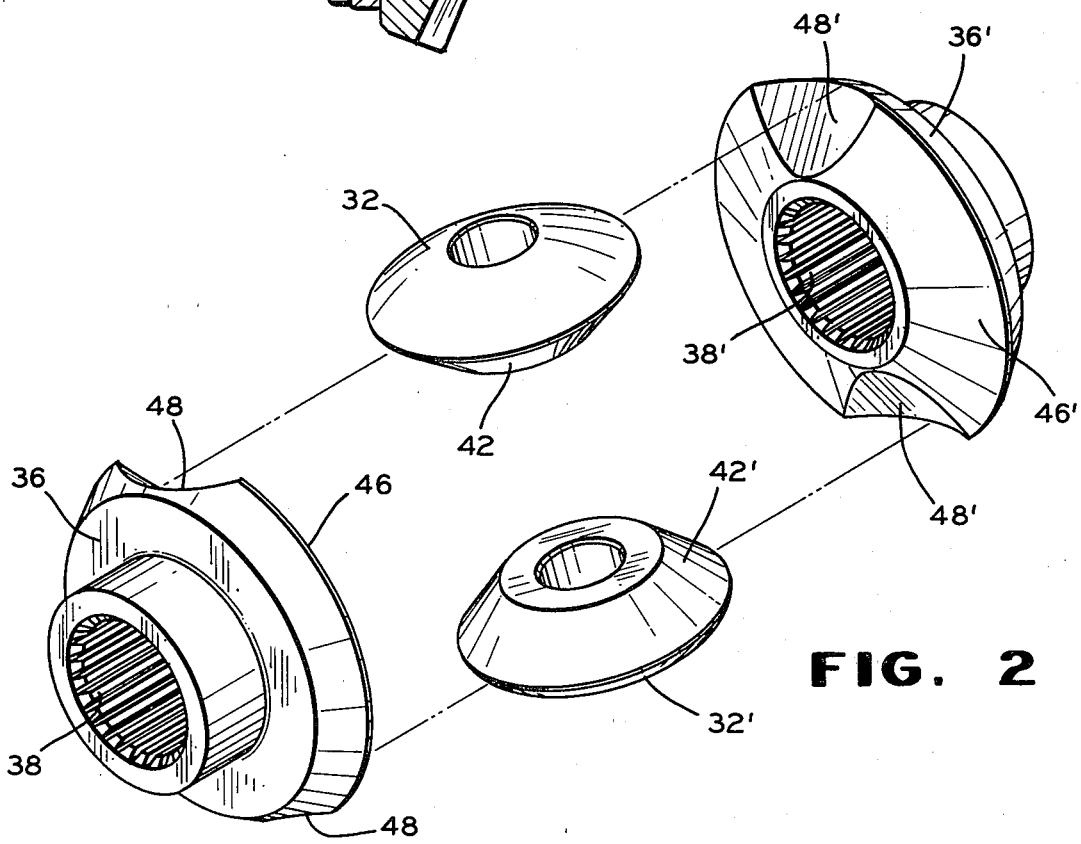
FIG. 2 is an exploded perspective view of the drive means shown in FIG. 1.
Figure 3:
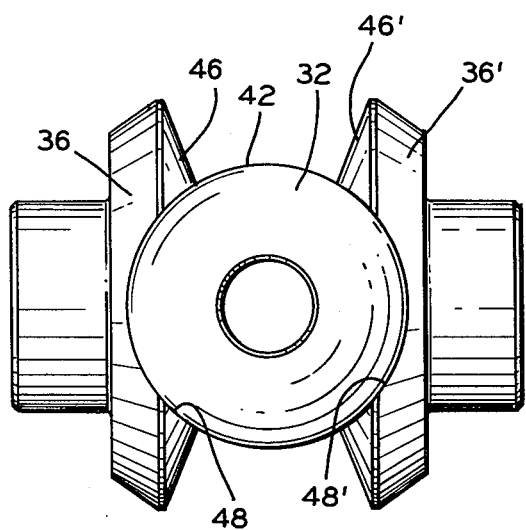
FIG. 3 is an assembled top view of the drive means shown in FIG. 1.
Figure 4:
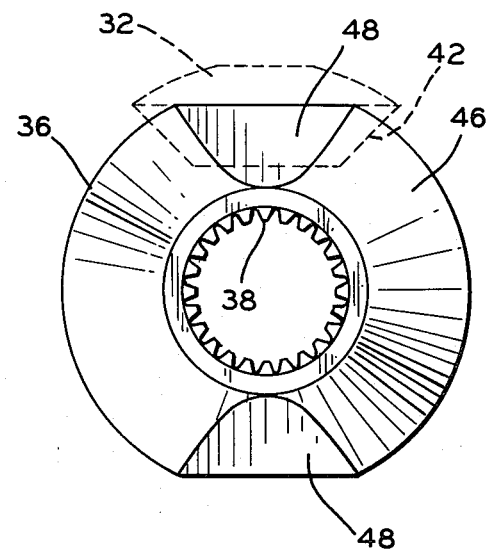
FIG. 4 is an end view of one of the drive components shown in FIG. 3.
Figure 5:
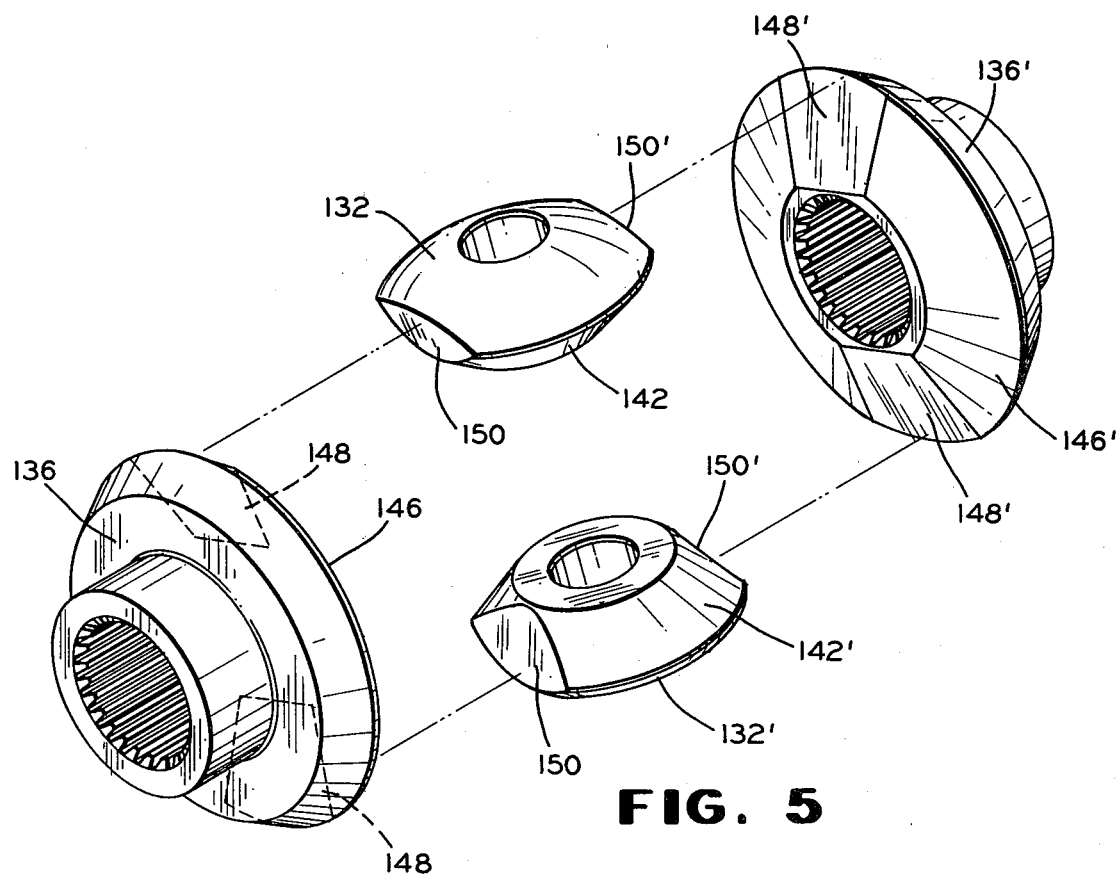
FIG. 5 is an exploded perspective view similar to FIG. 2 showing a modified locking means.
Figure 6:
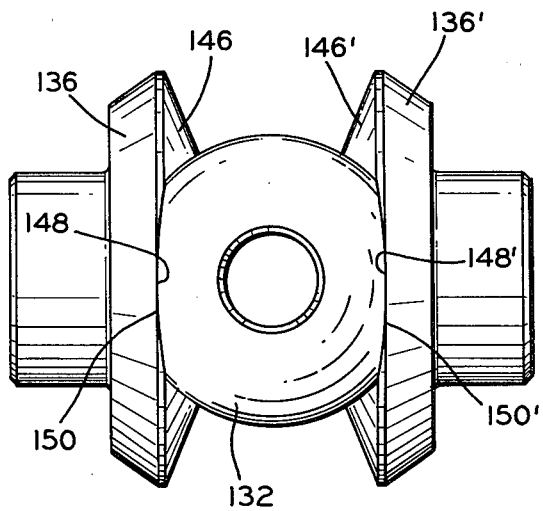
FIG. 6 is a view similar to FIG. 3 showing the modified locking means of FIG. 5.
Figure 7:
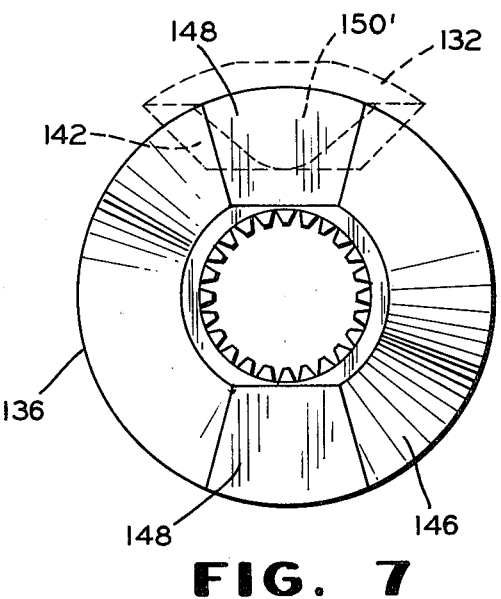
FIG. 7 is an end view of one of the drive components shown in FIG. 5.
Figure 8:
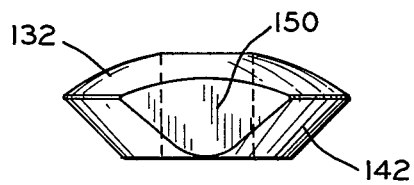
FIG. 8 is a side view of the other drive component shown in FIG. 5.

As seen in FIG. 2, pinion mate gear blanks 32, 32' and side gear blanks 36, 36' have opposed inner beveled surfaces 42, 42' and 46, 46' respectively. Both surfaces are annular in configuration with the beveled portion in facing relation. In the preferred embodiment the pinion mate and side gear blanks are locked together by concave semi-conical recesses 48, 48' on the inner face of side gear blank beveled surfaces 46, 46'. Recesses 48, 48' are spaced at a 180° angle and are of such size and shape as to mate with the inner face of pinion mate gear blank beveled surface 42, 42'. Thus, recesses 48, 48' result in a loose interfacing of pinion mate and side gear blanks along the face angle and face radii of the pinion mate and side gear blanks while achieving a locked connection therebetween due to the interfacing of the parts. Thus, pinion mate gear blanks 32, 32' have first annular surfaces 42, 42' for mating with recesses 48, 48' which form second surfaces on side gear blank annular surfaces 46, 46' and constitute the locking means in the preferred embodiment.

It will be apparent that the semi-conical recesses form relief portions on the side gear blanks only. However, it is understood that they could be constructed on the pinion mate gear blanks rather than on the side gear blanks as shown. Alternately, a single recess or relief portion could be constructed in each gear blank, i.e., one on pinion gear blank and the other on the side gear blank spaced 180 degrees apart, and still function in the intended manner.

The locking means described above serves to prevent relative movement between the pinion mate and side gear blanks. Since they are directly connected to the differential housing 16 through cross shaft 34 and side gear blanks are in turn connected directly to driven shafts 14, 14', a direct drive power path is established between drive shaft 12 and driven shafts 14, 14'.

An alternate embodiment is shown in FIGS. 5-8 wherein the locking means comprises flats 150, 150' on pinion mate gear blanks 132, 132' for mating with opposed flats 148, 148' on side gear blanks 136, 136'. Flats 150, 150' and 148, 148' are constructed on the inner faces of pinion mate beveled surfaces 142, 142' and inner faces of side gear beveled surfaces 146, 146'. The flats are spaced at 180° angles and machined so as to have the surfaces in flush interfacing contact. The degree of flatness and contact area can be varied without effecting the locking action. In this embodiment, pinion mate gear blanks 132, 132' provide first annular surfaces 142, 142' and side gear blanks 136, 136' provide second annular surfaces 146, 146' and the mating flats 148, 150 and 148', 150' constitute the locking means in this embodiment.

As in the preferred embodiment, the opposed flats in the alternate embodiment are relief portions constructed on both gear blanks and serve to prevent relative rotational movement between the pinion mate and side gear blanks 132, 132' and 136, 136'. Since the blanks are directly connected to differential housing 16 through cross shaft 34 they will rotate simultaneously with housing 16. With driven shafts 14, 14' being splined to side gear blanks 136, 136', drive from drive shaft 12 will be directly transmitted to driven shafts 14, 14'.

Figure 9:
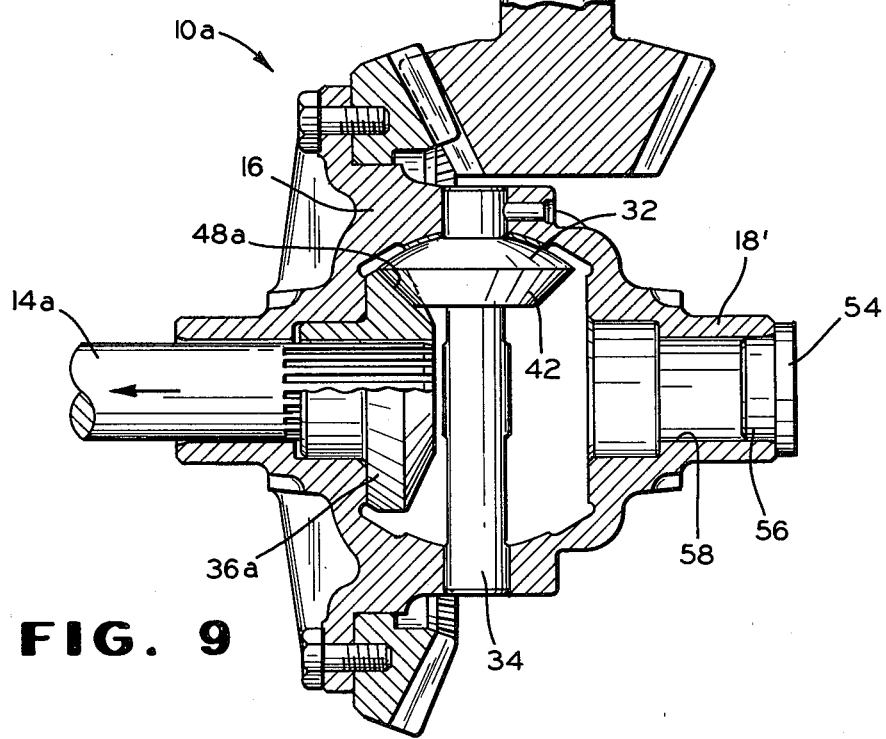
FIG. 9 is a further modification showing a drive unit having a single output.

It will be apparent from the foregoing description that the drive unit 10 may be modified to provide only a single output if desired. Such an arrangement is shown in FIG. 9 wherein a drive unit 10a is disclosed having a single output or drive shaft 14a. When a single output is employed only one pinion mate gear blank 32 and one mating side gear blank 36a is required to achieve the desired result. Pinion mate gear blank 32 is identical to that shown in FIGS. 1-4. However, it will be apparent in such a design that the locking means are only necessary at one location and not the 180° spacing as shown in the previous embodiments. Accordingly, side gear blank 36a is provided with a single recess 48a for receiving beveled surface 42 of pinion gear blank 32. In the construction illustrated in FIG. 9, the unused end is closed off in any suitable manner. For example, a closure 54 may be provided with a reduced diameter end 56 adapted to frictional fit within the bore 58 of housing trunnion 18'.

While the locking means shown is identical to that described in the preferred embodiment, it is understood that the locking means illustrated in FIGS. 5-8 could also be used.

From the foregoing description, it is apparent that the advantages of the present invention result from providing integral locking surfaces on the outer faces of standard gear blanks. This arrangement eliminates the need for additional elements or modification to existing parts in order to lock the members in place. In addition, since this design uses either standard purchased parts or unfinished parts, an end user can easily and quickly convert a conventional axle drive unit for use as a right angle drive having either a single or double output.

Further, the same principles could be applied to a differential of the spur gear type as opposed to the hypoid or bevel gear type described. As in the embodiments described, spur gear blanks would be employed in place of the hypoid or bevel gear blanks with either form of locking means used to rigidly connect the gear blanks to the support housing.

Having thus described preferred embodiments of the present invention, it should be understood that the invention is not to be limited to the specific constructions and arrangements shown and described. It will be apparent to those skilled in the art that modifications or alterations may be made without departing from the spirit and scope of the invention as set forth in the appended claims.

What is claimed is:

1. In a drive unit adapted to drivingly connect angularly disposed rotatable drive and driven shafts, said drive unit comprising:
   a housing drivingly connected to said drive shaft,
   drive means in said housing for transmitting rotation from said housing to said driven shaft,
   the improvement wherein said drive means comprises an input member drivingly connected to said housing,
   an output member drivingly connected to said driven shaft,
   said input and output members are unfinished gear blanks having opposed annular beveled outer surfaces,
   locking means integral with at least one of said input and output members engaging to directly connect said housing and driven shaft,
   said beveled surface on one of said gear blanks has a recess for mating with said beveled surface of said other gear blank and constituting said locking means.

2. A drive unit according to claim 1 or wherein said recess is semi-conical.

3. In a drive unit adapted to drivingly connect angularly disposed rotatable drive and driven shafts, said drive unit comprising:
   a housing drivingly connected to said drive shaft,
   drive means in said housing for transmitting rotation from said housing to said driven shaft,
   the improvement wherein said drive means comprises:
   an input member drivingly connected to said housing,
   an output member drivingly connected to said driven shaft,
   said input and output members comprising gear blanks having annular outer surfaces,
   locking means integral with at least one of said gear blanks directly connecting said housing and driven shaft,
   said locking means comprising a relief portion in said annular surface of one of said gear blanks for mating with said other gear blank.

4. A drive unit according to claim 3 wherein said relief portion is concave.

5. A drive unit according to claim 1 or 3 wherein said annular surface of said other gear blank has a relief portion for mating with said relief portion on said annular surface on said one gear blank.

6. A drive unit according to claim 4 or 5 wherein said annular surfaces comprise opposed beveled surfaces.

7. A drive unit according to claim 5 wherein said relief portions comprise opposed mating flats constituting said locking means.

8. A drive unit according to claim 4 wherein said relief portion is semi-conical.

9. A drive unit according to claim 1 wherein said annular surface of said other gear blank has a relief portion for mating with said recess on said annular surface on said one gear blank.

* * * * *